Figure 1:
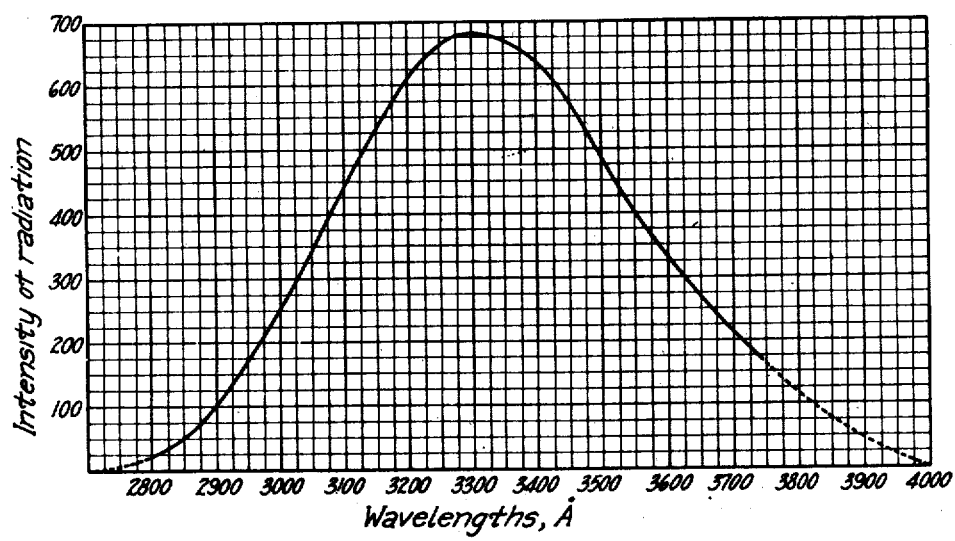

Aug. 17, 1948.  W. A. ROBERTS  2,447,210
ERYTHEMAL PHOSPHOR
Filed May 28, 1943

Inventor:
Willard A. Roberts, Deceased,
by Edna W. Roberts, Executrix,
by John H. Anderson
His Attorney.

Patented Aug. 17, 1948

2,447,210

UNITED STATES PATENT OFFICE

2,447,210

ERYTHEMAL PHOSPHOR

Willard A. Roberts, deceased, late of Euclid, Ohio, by Edna W. Roberts, executrix, Cleveland, Ohio, assignor to General Electric Company, a corporation of New York Application May 28, 1943, Serial No. 488,885

9 Claims. (Cl. 176—122)

This invention relates to a combination of an electric discharge device producing radiation and a phosphor exposed to this radiation to be excited thereby, and particularly to erythemal generators or "sun lamps," as they are commonly called. The invention involves a novel type of violet, particularly the 2537 Å. resonance radiaphosphor which is excited by short-wave ultration of mercury, and radiates in the erythemal range of the ultraviolet, extending from about 2800 Å. to about 3200 Å. For erythemal purposes, the phosphor may be internally coated on the envelope surface of a fluorescent tube or lamp of the ordinary low-pressure positive column type, such as that disclosed in U. S. Patent 2,259,040 to G. E. Inman, but made of glass which transmits ultraviolet of more than 2800 Å wave length and absorbs the shorter wave lengths harmful to the eyes, such as the glass used for the bulbs of sunlight lamps already commercially known.

Phosphors consist in general of a major proportion of a so-called base material or matrix and a minor proportion of another material called an activator. The radiation of the phosphor when excited depends on the relations between matrix and activator materials, as largely determined by heat-treatment which they undergo together, as well as on the materials themselves and their relative proportions. Apparently it is the metal of an activator that determines its special effect in a phosphor, although this metal is usually present as a compound.

In U. S. Patent 2,306,567 to Willard A. Roberts, granted December 29, 1942, there is described a type of phosphor which emits long-wave ultraviolet and visible deep blue when excited by short-wave ultraviolet such as 2537 Å., and consists of a phosphate of one of the alkaline-earth-metals (calcium, strontium, and barium) activated with cerium in the cerous state—a normal orthophosphate such as $$Ca_3(PO_4)_2$$

being generally preferable to other phosphates such as normal metaphosphate $Ca(PO_3)_2$, or pyrophosphate, $Ca_2P_2O_7$, and calcium phosphate being generally preferable to phosphates of strontium or barium. The preparation of this phosphor involves heating the component materials both under reducing conditions and under the influence of water vapor.

In U. S. Patent 2,270,124 to Huniger and Panke, granted January 13, 1942, phosphors are described which have as matrices borate or phosphate of any of a large assortment of metals taken from groups I, II, and III of the periodic system, and are activated with borate or phosphate of any of the metal silver, thallium, tin, and lead. These phosphors are produced by heating together borates or phosphates of the matrix and activator metals, or compounds which react when heated to yield these borates or phosphates. Phosphors activated with thallium are described as yielding a moderate visible fluorescence of violet-blue color.

In accordance with the present invention, it has been found possible to produce a very different type of phosphor from matrix material and activating metal mentioned in these patents, prepared in a distinctive manner, and specially useful as a generator of erythemal ultraviolet radiation. In a favorable form having as matrix a phosphate of alkaline-earth-metal, and activated with thallium, the novel phosphor is distinguished not only by high output of erythemal ultraviolet, but by absence of perceptible visible fluorescence—blue or of any other color. As amongst phosphates of the alkaline-earth-metals (which as mentioned include calcium, strontium, and barium), the normal orthophosphate of calcium, $Ca_3(PO_4)_2$, is particularly referred to in the following description of a species of the phosphor and its manufacture. A fluorescent lamp such as mentioned above containing this thallium-activated normal calcium orthophosphate has given twice the efficiency of the S4 sun lamp as a means of converting electrical energy into erythemal radiation, the S4 sun lamp being a commercially known lamp of the high pressure mercury vapor type. The total quantum efficiency of the phosphor amounts to some 55 per cent or upward, taking into account its considerable output in the long ultraviolet; while for the erythemal range of 2800–3200 Å. alone, t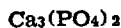 quantum efficiency amounts to as much as 7 per cent or more, which is high for the field of erythemal ultraviolet generation.

Figure 2:
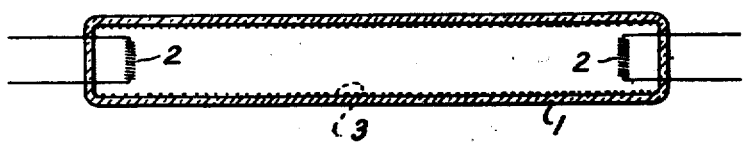

In the drawing, Fig. 1, is a diagram consisting of a curve representing the spectral distribution of the radiation from a 15-watt fluorescent lamp having its envelope internally coated with a thallium-activated calcium phosphate prepared substantially as hereinafter described, the horizontal coordinates representing wave lengths, and the vertical representing intensity of radiation, on an arbitrary scale; and Fig. 2 is a somewhat diagrammatic elevation, in section, of a form of sunlamp comprising my invention.

The lamp shown in Fig. 2 comprises an elongated envelope or tube I which, as stated above, is made of glass which transmits ultraviolet of greater wavelength than 2800 Å. and absorbs the shorter wave lengths harmful to the eyes. Suitable electrodes 2 are located at the ends of the envelope to sustain therebetwen a low pressure positive column discharge through the usual fluorescent lamp atmosphere of argon and mercury vapor whereby to generate an abundance of radiations of 2537 Å. wave length. The internal surface of the envelope is provided with a coating 3 of a phosphor which is excited by the 2537 Å. radiation to emit a large amount of radiation in the erythemal range of about 2800 to 3200 Å.

As shown in Fig. 1 of the drawing, the radiation of this phosphor starts from zero at a wave length somewhat below 2800 Å., the lower limit of the erythemal range, peaks around 3300 Å., above the upper limit of the erythemal, falls to a relatively low value at 3800 Å., and to zero near 4000 Å., the lower limit of the visible. The dotted extremities of the curve represent exterpolations beyond the range covered by actual measurement, but may be considered substantially or approximately correct. While the major portion of the total radiation falls above the erythemal range, the actual amount of radiation within that range is nevertheless so large as to be of great practical value.

It is the particular response of the phosphor to 2537 Å. ultraviolet excitation, the richness of its radiation in the erythemal ultraviolet wavelengths of 2800 Å. to 3200 Å., and the richness of the radiation from a low pressure mercury vapor discharge in 2537 Å. that make the combination of the phosphor with a mercury vapor lamp of this kind a uniquely efficient sunlamp or erythemal generator. For various purposes, the essential freedom of the phosphor from visible luminescence is an added advantage.

Erythemal calcium phosphate phosphor activated with thallium may be prepared by heating material comprising or yielding the desired phosphate and thallium. While calcium phosphate as such may be mixed and fired with thallous hydroxide, TlOH, or wetted down with an aqueous solution of thallium nitrate or other suitable compound that decomposes under heat to form thallous oxide, Tl₂O, and then dried and fired, intimate and homogeneous inter-incorporation of the thallium component with the calcium phosphate is most readily effected by forming the phosphate in the presence of the thallium vehicle. For this purpose, a phosphate may be brought into reaction with calcium oxide (CaO) or some compound that will yield calcium oxide. Thus calcium nitrate and ammonium phosphate to form normal calcium orthophosphate, $Ca_3(PO_4)_2$ and thallous hydroxide as a source or vehicle of thallium may be mixed and preliminarily heated together. In other words, the orthophosphate is synthesized in the effective presence of thallium. In any case, the real synthesis or "formation" of the phosphor by bringing the thallium into activating relation to the calcium phosphate structure should take place in the presence of a sulphate, such as sulphuric acid or ammonium sulphate, for example, which decompose at or about the temperature of formation of the phosphor—or of a chemical equivalent which will neutralize excess calcium oxide or the like in a form stable under the heating and under the conditions of lamp operation—in order to obtain the novel phosphor in a form producing the characteristic erythemal radiation at high efficiency substantially without concomitant visible light.

In general, the batch ingredients employed should be of the high purity customarily used in the preparation of phosphors, and preferably of at least C. P. grade. In this connection, freedom from contamination with other metals is highly important, and especially, in a practical way, the purity of the thallium or thallium vehicle. For example, a 50 per cent improvement in the total quantum efficiency of the phosphor has been obtained by substantially purifying the thallium vehicle or component of small amounts or traces of lead, silver, and copper, or other metals, with a concomitant 30 per cent increase in the erythemal output (2800–3200 Å.). The importance of such purity will be better appreciated in view of the relatively high volatility of thallium and its compounds, which results in loss of a major portion of the thallium content of a batch during firing at desired temperatures of 950–1000° C. to "form" the phosphor, and even in substantial loss of thallium during the preliminary heating of a batch to synthesize and dry out the desired phosphate before the firing to form the phosphor. As the contaminating lead, silver, copper or other metal(s) do not volatilize materially at temperatures around 1000° C., the percentage relation of such impurity to the thallium increases several fold in the preliminary heating and the higher firing, and its poisoning effect toward the thallium as an activator of ultraviolet fluorescence is greatly augmented.

The volatility of thallium may even be utilized to avoid contamination with other metal, by introducing the thallium into the phosphor only by calcining the batch with a thallium vehicle or component present in the furnace, instead of mixed in as an ingredient of the batch. However, this method of introduction is difficult to control so as to assure a constant proper proportion of thallium in successive batches of phosphor.

Proportions of the ultimate phosphor components and of the batch ingredients used in producing the phosphor are not very critical. However, some excess of calcium oxide over that required to react completely with the phosphate ingredient of the batch is desirable, to assure formation of calcium orthophosphate free of more acid phosphates such as calcium metaphosphate, and an excess of sulphate over that required to react completely with this excess of calcium oxide is also desirable. Even in the original raw batch, no more than a minor percentage of thallium is really required. Owing to the relative volatility of thallium, the proportion of the thallium vehicle in the batch has only a limiting influence on the erythemal brightness of the phosphor, which depends rather on the percentage of thallium that can be retained and activatingly combined in the product during the higher heat treatment of the batch. Generally speaking, a fraction of a per cent of retained thallium is sufficient: thus about ⅓ of 1 per cent of thallium itself in the final phosphor (or even less) gives very satisfactory results; something like 0.4 of 1 per cent may be expected to give about the maximum erythemal intensity or brightness; and any excess over about ½ per cent is generally superfluous or even disadvantageous, giving rather less than maximum brightness.

One ultimate effect of the sulphate or the like that is used in preparing the phosphor is to convent or neutralize excess of calcium oxide in the batch to calcium sulphate, thus virtually eliminating from the phosphor a calcium oxide component that might otherwise afterward react with atmospheric or other moisture and carbon dioxide to form calcium hydroxide and carbonate, which would have a harmful effect on the brightness or intensity of the radiation from the phosphor. Excess of the sulphuric component over what is required to convert excess calcium oxide to sulphate passes off during the higher heating of the batch to "form" the phosphor, leaving behind the above-mentioned calcium sulphate, whose presence in the phosphor (even though it is not itself an activator) seems to augment the radiant output. It may be, also, that the presence of the sulphuric component during the "formation" of the phosphor conditions or contributes toward bringing the activator into more effective activating relation to the phosphate matrix. Whatever the exact mechanism(s) involved, the increase in brightness of the phosphor resulting from the sulphuric component in the batch is very pronounced: e. g., a favorable specimen of phosphor made with sulphuric acid in the batch, according to the batch formula and procedure described hereinafter, showed about ten times the radiant output obtained from a phosphor prepared similarly but with entire omission of the sulphuric component called for by the said formula.

Using the particular ingredients above mentioned, a suitable composition for the raw batch is:

Calcium nitrate, $Ca(NO_3)_2 \cdot 4H_2O$___grams__ 100
Ammonium phosphate, $(NH_4)_2HPO_4$__do____ 36
Thallous hydroxide, $Tl_2(OH)_2$_____do____ 1½
Concentrated sulphuric acid, $H_2SO_4$____cc__ 5

The first three ingredients may be thoroughly mixed together dry in a fine state of division, and then preliminarily heated to produce calcium phosphate by reaction between the calcium nitrate and the ammonium phosphate, and expel the gaseous products that are liberated. As heat is applied, the mixture melts and then dries out again. While it is molten, the sulphuric acid may be added and stirred in, preferably well diluted with water to make the reaction more gentle. The temperature may be allowed to rise to some 200–250° C., but need not go higher than this, and should not exceed about 600° C., to avoid more than minimum loss of thallium by vaporization. When the evolution of gas has ceased, the dry mixture of calcium phosphate and thallous oxide remaining is allowed to cool, and may then be ground in a mortar and passed through a sieve of some 100 to 200 mesh—say 150 mesh. It may then be calcined in a refractory electric muffle furnace, either in an ordinary refractory crucible (as of porcelain or alundum) with exposure to the air, or enclosed against loss of thallium as hereinafter described, being fired long enough and at a sufficient temperature to bring the thallium into activating relation to the calcium phosphate. Firing for half an hour to an hour at about 950° C. is effective, and results in a thallium content in the phosphor amounting to some 0.3 to 0.5 per cent by weight, according to the conditions of heating. The orthophosphate is not sintered by a temperature of the order of 1000° C. or under, much less melted. The temperature and time of firing may be kept down as much as possible, to minimize loss of thallium, which is uneconomical and may result in diminished brightness of the phosphor; for example, one batch showed 0.33 per cent thallium and excellent brightness in a sample fired one hour in a crucible at 950° C., but showed only 0.12 per cent thallium and greatly diminished brightness in a sample that was fired under the same conditions for three hours. After the desired period of heating, the product is allowed to cool, and may then be sieved as before the firing, leaving it ready for use. It may be applied to the lamp tube or envelope on which it is used with the aid of a carbonaceous binder in the usual way, though any ball-milling to incorporate the powder in the binder should preferably be brief. To give the highest erythemal output, the phosphor coating on the envelope wall should be thinner than is the general practice in ordinary fluorescent tubes, since the phosphor appears to be itself opaque to erythemal ultraviolet. Positive column tubes of 1-inch diameter internally coated with the phosphor have given higher erythemal efficiencies than 1½ inch tubes.

Besides using different batch ingredients or proportions instead of those in the formula above, the procedure may be varied in other ways, and even with advantage. For example, calcium phosphate may be formed by precipitation from mixed solutions of calcium nitrate, ammonium phosphate, and thallium nitrate or other salt; then mixed with a sulphate, such as ammonium sulphate or sulphuric acid (or a chemical equivalent that will neutralize the excess calcium oxide or the like in a form stable under the heating and the conditions of lamp operation); and finally dried and fired or calcined, the precipitation being carried out very much as described in Patent No. 2,306,567 for the production of calcium phosphate activated with cerium. As there mentioned, the precipitated calcium phosphate has calcium hydroxide intimately associated or combined with it in a complex according to the formula $3(Ca_3(PO_4)_2) \cdot Ca(OH)_2$, as usual when tricalcium phosphate is formed by precipitation. Moreover, the firing or calcining of the calcium phosphate to effect activating combination of the thallium component therewith may be carried out in confinement in a closed vessel, and even under pressure—instead of in an open vessel with atmospheric exposure—in order to retain and conserve the thallium in the matrix of calcium sulphate. For example, the calcium phosphate may be hermetically sealed up in a vessel of fused quartz when fired in an electric muffle furnace. As already suggested, the thallium or thallium vehicle for activating the phosphate may be volatilized thereinto by merely calcining the phosphate with such vehicle in a closed vessel, instead of by mixing a thallium compound with the batch material.

The phosphor prepared as described gives no appreciable visible fluorescence under either short-wave or long-wave ultraviolet.

What is claimed as new and desired to be secured by Letters Patent of the United States is:

1. A sunlamp comprising a low-pressure mercury vapor discharge device, whose radiation is rich in 2537 Å. ultraviolet, and which includes a sealed envelope of glass which is impermeable to radiations of wave length shorter than about 2800 Å. but which transmits ultraviolet radiations of longer wave length in combination with unfused and unsintered fluorescent calcium orthophosphate activated by thallium and excited by the 2537 Å. ultraviolet to the emission of ultraviolet in erythemal wave lengths of about 2800 to 3200 Å. at an efficiency substantially in excess of that of a high pressure mercury vapor discharge, but essentially free of visible luminescence.

2. A generator of erythemal radiation comprising a phosphor of unfused and unsintered alkaline earth metal orthophosphate activated by thallium, and emitting erythemal ultraviolet radiation of about 2800 to 3200 Å. when subjected to ultraviolet of shorter wave length, but essentially free of visible luminescence.

3. A fluorescent composition of unfused and unsintered calcium orthophosphate forming a phosphor matrix and containing a minor proportion of thallium in activating combination with the phosphate structure, and when subjected to 2537 Å. radiation emitting ultraviolet that extends substantially from 2700 Å. to 4000 Å. and is rich in erythemal wave lengths of about 2800 to 3200 Å., but essentially free of visible luminescence.

4. A method of preparing fluorescent thallium activated alkaline earth metal orthophosphate that is characterized by emission of erythemal ultraviolet, under excitation by shorter wave length ultraviolet, but is essentially free of visible luminescence; which method comprises reacting together, in the presence of thallium, orthophosphate and alkaline earth metal compounds in proportion which interact to yield the alkaline earth metal orthophosphate; and heating the product to a temperature of about 1000° C., whereby thallium is activatingly combined with the orthophosphate structure without fusing or sintering the composition.

5. A method of preparing fluorescent thallium activated calcium orthophosphate that is characterized by emission of erythemal ultraviolet, under excitation by shorter wave length ultraviolet, but is essentialy free of visible luminescence; which method comprises reacting together, in the presence of thallium, orthophosphate and calcium compounds of compositions and proportions which yield by their interaction only volatile matter and the calcium orthophosphate; and heating the product to a temperature of about 1000° C., whereby thallium is activatingly combined with the orthophosphate structure without fusing or sintering the composition.

6. A method of preparing fluorescent thallium activated alkaline earth metal orthophosphate that is characterized by emission of erythemal ultraviolet, under excitation by shorter wave length ultraviolet, but is essentialy free of visible luminescence; which method comprises reacting together, in the presence of thallium, orthophosphate and alkaline earth metal compounds, the latter in excess of alkaline earth metal orthophosphate proportions; and heating the product to a temperature of about 1000° C. in the presence of sulphate in amount at least sufficient to react with the excess alkaline earth metal compound, whereby thallium is activatingly combined with the orthophosphate structure without fusing or sintering the composition, and said excess of other alkaline earth metal compound is converted to alkaline earth metal sulphate.

7. A method of preparing fluorescent thallium activated tricalcium orthophosphate that is characterized by emission of erythemal ultraviolet, under excitation by shorter wave length ultraviolet, but is essentially free of visible luminescence; which method comprises mixing together solutions of orthophosphate, thallium, and calcium compounds, the last-mentioned in excess of tricalcium orthophosphate proportions, thereby precipitating this orthophosphate in admixture with an excess of other calcium compound, and with a thallium component intimately incorporated therein; and heating this product with sulphate in amount at least sufficient to react with said excess of other calcium compound to a temperature of about 1000° C., whereby thallium is activatingly combined with the orthophosphate structure without fusing or sintering the composition, and said excess of other calcium compound is converted to calcium sulphate.

8. A fluorescent sunlamp comprising a low pressure positive column mercury vapor electric discharge device whose radiation is predominately ultraviolet of 2537 Å. and which includes an elongated sealed envelope of glass which is impermeable to radiations of wave length shorter than about 2800 Å. but which transmits ultraviolet radiations of longer wave length, and a coating on the interior of said envelope of fluorescent material consisting of unfused and unsintered calcium orthophosphate activated by thallium and excited by the radiation of 2537 Å. to emit ultraviolet in the erythemal range of about 2800 to 3200 Å. at an efficiency substantially in excess of that of high pressure mercury vapor discharge.

9. A method of preparing fluorescent thallium-activated calcium orthophosphate that is characterized by emission of erythemal ultraviolet, under excitation by shorter wave length ultraviolet, but is essentially free of visible luminescence; which method comprises reacting together, in the presence of thallium, orthophosphate and calcium compounds, the latter in excess of calcium orthophosphate proportions; and heating the product to a temperature of about 1000° C. in the presence of sulphate in amount at least sufficient to react with the excess calcium compound, whereby thallium is activatingly combined with the orthophosphate structure without fusing or sintering the composition, and said excess of other calcium compound is converted to calcium sulphate.

EDNA W. ROBERTS,
Executrix of the Estate of Willard A. Roberts, Deceased.

REFERENCES CITED

The following references are of record in the file of this patent:

UNITED STATES PATENTS

| Number | Name | Date |
| --- | --- | --- |
| 2,241,950 | Huniger | May 13, 1941 |
| 2,254,954 | Aschermann | Sept. 2, 1941 |
| 2,270,124 | Huniger | Jan. 13, 1942 |
| 2,272,992 | Hebo | Feb. 10, 1942 |
| 2,281,235 | Cooper | Apr. 28, 1942 |
| 2,306,567 | Roberts | Dec. 29, 1942 |
| 2,306,626 | Huniger | Dec. 29, 1942 |
| 2,355,258 | Biggs | Aug. 8, 1944 |

FOREIGN PATENTS

| Number | Country | Date |
| --- | --- | --- |
| 387,130 | Great Britain | Feb. 2, 1933 |